(12) United States Patent
Villalobos Davila

(10) Patent No.: US 9,322,138 B2
(45) Date of Patent: Apr. 26, 2016

(54) INDUSTRIAL EQUIPMENT FOR THE HOT RECYCLING OF ASPHALT MIXES

(76) Inventor: Rodolfo Villalobos Davila, Monterrey (MX)

(*) Notice: Subject to any disclaimer, the term of this patent is extended or adjusted under 35 U.S.C. 154(b) by 149 days.

(21) Appl. No.: 13/984,513

(22) PCT Filed: Feb. 8, 2012

(86) PCT No.: PCT/MX2012/000014
§ 371 (c)(1),
(2), (4) Date: Sep. 11, 2013

(87) PCT Pub. No.: WO2012/108755
PCT Pub. Date: Aug. 16, 2012

(65) Prior Publication Data
US 2013/0343145 A1 Dec. 26, 2013

(30) Foreign Application Priority Data
Feb. 8, 2011 (MX) .................. MX/A/2011/001458

(51) Int. Cl.
*E01C 19/10* (2006.01)
*C04B 18/16* (2006.01)
*C04B 26/26* (2006.01)
(Continued)

(52) U.S. Cl.
CPC ............ *E01C 19/1004* (2013.01); *C04B 18/167* (2013.01); *C04B 26/26* (2013.01); *C10C 3/007* (2013.01); *E01C 19/1036* (2013.01);
(Continued)

(58) Field of Classification Search
CPC .................................................. E01C 19/1004
USPC ................................................. 366/7, 23–25
See application file for complete search history.

(56) References Cited

U.S. PATENT DOCUMENTS 4,190,370 A 2/1980 Brock et al.
4,318,619 A * 3/1982 Schlarmann ...................... 366/4
(Continued)

FOREIGN PATENT DOCUMENTS

EP 0985768 3/2000
GB 2205573 12/1988

*Primary Examiner* — David Sorkin
*Assistant Examiner* — Abbas Rashid
(74) *Attorney, Agent, or Firm* — Baker & McKenzie LLP

(57) ABSTRACT

The present disclosure relates to industrial equipment for the hot recycling of asphalt mixes. The industrial equipment may comprise a portable bank of hoppers which may be used to meter RAP and unadulterated petrous materials and may be mounted on a supporting structure, along with gear motors which control the metering and send a signal to a flow indicator in a control panel where it may be recorded and controlled. A conveyor belt may be provided below the hopper bank in order to receive the material and transport same to a rotary cylinder comprising an industrial open-flame burner that may be used to transmit heat energy indirectly to the RAP and to the supply of unadulterated petrous material. In some embodiments, the present disclosure may also comprise: a tank for storing a mixture of asphalt and rejuvenating agent enhanced with polymers, which may be metered using a volumetric gear pump through a pipe towards the rotary cylinder, the outlet of said cylinder comprising a temperature sensor that may send a signal to the recycled asphalt mix temperature indicator in the control panel; a recycled asphalt mix lifting system which may convey said mix to a discharge silo; a combustion gas extractor which may discharge combustion gases from the burner; a fuel storage tank which may be used in the industrial burner; and a weight measuring element which may be at the inlet of the rotary drum.

8 Claims, 3 Drawing Sheets

(51) Int. Cl.
*C10C 3/00* (2006.01)
*C04B 111/00* (2006.01)
*C08L 95/00* (2006.01)

(52) U.S. Cl.
CPC ......... *E01C19/1072* (2013.01); *E01C 19/1077* (2013.01); *C04B 2111/0075* (2013.01); *C08L 95/00* (2013.01); *E01C 2019/1095* (2013.01); *Y02W 30/95* (2015.05)

(56) References Cited

U.S. PATENT DOCUMENTS

| | | | |
|---|---|---|---|
| 5,190,371 A | * | 3/1993 | Gjerulff .................. 366/25 |
| 5,322,367 A | | 6/1994 | Nath et al. |
| 2003/0194273 A1 | | 10/2003 | Lloyd |
| 2011/0247525 A1 | * | 10/2011 | Nasser et al. ............. 106/668 |

* cited by examiner

INDUSTRIAL EQUIPMENT FOR THE HOT RECYCLING OF ASPHALT MIXES

FIELD OF THE DISCLOSURE

The present disclosure relates to the industry of processing and transforming solid asphalt residues. More particularly, the present disclosure relates to an industrial equipment for the hot recycling of asphalt mixes.

BACKGROUND OF THE DISCLOSURE

All over the world there are asphalt-paved highways, driveways, avenues, and streets. Asphalts in pavement are 100% recyclable; they can be recycled many times. Asphalts are mainly composed of asphaltenes and maltenes. Asphalts are exposed to weathering, which provokes aging due to a decrease in the maltenes phase, produced by oxidation.

Asphalt pavements are flexible, but aging and lack of maltenes cause them to be rigid, which causes cracking (alligator skin) and a subsequent detachment of blocks.

In the market, there are plants manufactured abroad with attachments to process asphalt mixes, in lower percentages. These are large plants, highly expensive and not easily transportable. Moreover, the process used differs from the present disclosure, as explained below.

These plants may have a device between the first and the second third of the rotary dryer, into which a lesser percentage of RAP (Reclaimed Asphalt Pavement or Recycled Asphalt Pavement) may enter by means of a hopper, with the purpose of mixing it with a high content of hot unadulterated petrous materials, which may heat it toward recycling.

These industrial equipment may present the following disadvantages:
a) Recycled RAP percentage is very low.
b) Supplying of rejuvenating agent cannot be made in the manner conducted in this equipment
c) Lower quality of resulting material.
d) Large equipment not easily transportable.
e) Highly expensive.

There are other equipment's for production of asphalt mixes called double barrel, such as the one disclosed in international request WO 2007/103345.

These industrial equipment may present the following disadvantages:
a) RAP is not 100% recycled.
b) Large size, not easily transportable because these equipment are provided 20 with: the first dryer adapted to receive and mix unadulterated aggregates and fine RAP; a primary burner adapted to produce a burner flame for heating and drying fine aggregates in the first dryer; a second dryer adapted to receive ordinary RAP; the second burner adapted to produce a burner flame and to dry the ordinary RAP in the second dryer; a mixer adapted to receive unadulterated aggregates and fine RAP from the first dryer and the ordinary RAP from the second dryer and mix the unadulterated aggregates, the fine RAP and the ordinary RAP to produce a hot asphalt mix.
c) Highly expensive.

Reference is now made to patent MX 183720 to Robert H. Nath, et al., filed on Aug. 8, 1992 and granted on Jan. 9, 1997. The patent holder is Cyclean, Inc. claiming US priorities U.S. Pat. No. 754,264 and U.S. Pat. No. 803,642. Said patent protects an apparatus to control the production speed at a drum plant to produce asphalt from pavement, recycled asphalt; characterized in that it comprises a combination: assembly to detect tons per hour (TPHa) produced at the plant; assembly to compare tons per hour (TPHa) with tons per hour desired (TPHd); assembly to detect the drum inlet gas temperature, when (TPHd) is lower than (TPHa); assembly to compare the drum inlet gas temperature (TDI) at a maximum drum inlet gas temperature (TDImax); assembly to increase the drum inlet gas temperature (TDI), when the drum inlet gas temperature (TDI) is lower than the maximum drum inlet gas temperature (TDI) and assembly to increase the hourly rating when the drum inlet gas temperature (TDI) is increased.

Reference is now made to Mexican patent MX192620 to Robert H. Nath et al., filed on Nov. 27, 1992 and granted on Jul. 13, 1999, which holder is Cyclean, Inc., and claiming US priorities U.S. Pat. No. 803,642 and U.S. Pat. No. 951,084. Said patent protects an apparatus to control production speed at a drum plant to produce asphalt from pavement, recycled asphalt; characterized for comprising combination: assembly to detect tons per hour (TPHa) produced at the plant; assembly to compare tons per hour (TPHa) with tons per hour desired (TPHd); assembly to detect the drum inlet gas temperature, when (TPHd) is lower than (TPHa); assembly to compare the drum inlet gas temperature (TDI) at a maximum drum inlet gas temperature (TDImax); assembly to increase the drum inlet gas temperature (TDI), when the drum inlet gas temperature (TDI) is lower than the maximum drum inlet gas temperature (TDI) and assembly to increase the hourly rating when the drum inlet gas temperature (TDI) is increased.

However, the processes applied in this type of equipment differ from those in the present disclosure.

Document E2 184 964, published on Mar. 4, 1988, discloses a drum mixer for asphalt concrete production comprising a drum rotating about one axis; the drum has an inlet in the first end of the drum to receive gravel flowing downstream along the drum toward a second end of the drum opposite to the first end, and an outlet next to the second end to discharge asphalt concrete. The drum is provided with a burner with a burner head to generate a flame delimiting a combustion volume, located in the middle of the first and second ends of the drum; the burner head divides the drum in a drying zone located between the burner head and the first end of the drum, and a mixing zone located between the burner head and the second end of the drum. The head generates hot combustion gases flowing upstream along the drum through the drying zone toward the first end of the drum in a flow direction counter to the gravel flow from the first end, through the drying zone, toward the second end of the drum to dry the gravel. Drum has a plurality of radiant heat shielded paddles separated inward a portion of inner wall of the drum extending circumferentially; the paddles extend from a portion within the drum next to the burner head in general axially toward the first end of the drum and circumferentially to the drum surrounding the combustion volume at the inner side of the paddles and delimiting a chamber substantially annular between the paddles and the portion of the inner wall of the drum. Next to an upstream end of the plurality of paddles there is a drum inlet for placing a recycling asphalt material in the annular chamber, being the paddles circumferentially separated from each other with respect to the drum in order to cause the received gravel flowing inside the combustion volume and along some surfaces radially internal to it, from the upstream flow gravel, in general radially outwards between the paddles and into the chamber to be mixed with the recycling asphalt material in the chamber, while the paddles substantially avoid a back-flow of gravel from the chamber to the inside of the combustion volume. This is intended to produce asphalt concrete with higher returns and reduce heat loss and, particularly, to produce an asphalt concrete product from the recycling gravel and unadulterated gravel, where a recycling asphalt material with higher humidity content can be combined with the unadulterated gravel without reducing the production capacity or increase of the residence time.

Document U.S. Pat. No. 4,095,285, published on Jun. 13, 1978, discloses a slanting rotary mixing drum to prepare coated products (e.g. products of asphalt concrete or hot or cold asphalt products/mixtures of aggregate) which comprises, at the frontal end a burner extending inside that frontal end; a pipe to spray the aggregate, this pipe extends inside the drum with adjustable length; the first zone provided with paddles extending inside the drum and extending in "spiral" in the inner surface of the drum, where the pitch of the "spiral" is set to be sufficiently thick for the material to be rapidly introduced inside the next zone of the drum; paddles are intended only to guide and transport the aggregates from the first zone to the second zone, said second zone is an pre-heating zone, used to pre-dry, from this second zone the drum has material lifting elements that lift the material up to a given height for the material to subsequently fall during the drum rotation; a third zone to dry, mix and heat the product coming from the second zone, at this zone an aggregate is discharged through a pipe; an anti-dust screen is provided at the end of the third zone to prevent the dust escaping from the rotary drum. In this way, a device is provided to obtain coated materials through pre-heating, pre-drying and mixing, and the coating is performed under satisfactory conditions and the residual humidity content of the aggregate coat results in a low dust emission.

None of the above documents discloses a continuous helicoid (as shown in FIG. 2 of this application), and said helicoid takes 30-80%, preferably a 60%, of the total length of the rotary cylinder, which allows recycling 100% of RAP.

SUMMARY

The present disclosure, in some embodiments, may relate to an industrial equipment for the hot recycling of asphalt mixes to recycle aged asphalt pavements.

In some embodiments, the present disclosure may relate to industrial equipment for the hot recycling of asphalt mixes and to obtain a hot recycled asphalt mix that may be of excellent quality and higher durability.

In some embodiments, the present disclosure may relate to industrial equipment for the hot recycling of asphalt mixes that may be sustainable and ecological.

In some embodiments, the present disclosure may relate to industrial equipment for the hot recycling of asphalt mixes that may reduce the use of unadulterated petrous materials and may avoid depredation of woods, hills and rivers.

In some embodiments, the present disclosure may relate to industrial equipment for the hot recycling of asphalt mixes, which may use the asphalt contained in the RAP thereby decreasing the excessive use of fossil hydrocarbons, which may tend to be more expensive and scarce.

In some embodiments, the present disclosure may relate to industrial equipment for the hot recycling of asphalt mixes to secure sustainability of pavements in the long term.

In some embodiments, the present disclosure may relate to industrial equipment for the hot recycling of asphalt mixes that may permit recycling of 100% RAP and may avoid clandestine disposition of RAP.

In some embodiments, the present disclosure may relate to industrial equipment for the hot recycling of asphalt mixes that may avoid the use of confined areas which may be occupied by organic materials that may produce methane gas for electric power generation.

In some embodiments, the present disclosure may relate to industrial equipment for the hot recycling of asphalt mixes that may further reduce the costs of road rebuilding.

One of ordinary skill in the art would appreciate other attributes and objectives of the present disclosure, which will be evident with the detailed description and the accompanying figures.

For the development of the equipment and process for the hot recycling of asphalt mixes, different tests were conducted with the following objectives: an indirectly heating equipment that may allow for recycling of 100% RAP; may provide for sufficient production capacity; may provide for low costs; may be portable, and easy to install and uninstall; may allow for a system wherein the material to be recycled may not be subject to combustion because of asphalt lose properties; may provide with good energy transfer for lowering costs; may allow for an option to supply unadulterated petrous material to improve the recycled asphalt mixture; may allow for a controlled metering of RAP and unadulterated petrous material prior to the Industrial Hot Recycling Asphalt Mixes for a good quality of recycled asphalt mixture and also to have a built-in zone for mixing RAP materials, petrous materials, asphalt-rejuvenating agent enhanced with polymers, in an optimal metering to obtain an asphalt mixture of excellent quality.

One of ordinary skill in the art would appreciate that asphalts are mainly composed of asphaltenes and maltenes. Asphalts exposed to weathering may exhibit signs of aging; such aging is due to the decrease in the maltenes phase, produced by oxidation.

Asphalt pavements may be flexible, but aging and lack of maltenes may cause them to be rigid, which may cause cracking (alligator skin) and may result in a subsequent detachment of blocks.

If the same portion of lost maltenes are added to those asphalts they may regain their original physical and chemical characteristics.

Better yet, when those added maltenes are enhanced with polymers, the asphalts may exceed their original physical and chemical characteristics.

One of ordinary skill in the art would appreciate the term of RAP (Reclaimed Asphalt Pavement or Recycled Asphalt Pavement) as used in the field of roadways construction.

RAP may be obtained through:
1. Milling of the asphalt surface, which may be in cold or previously preheating the asphalt surface
2. Milling of the preheated asphalt surface.
3. Blocks of Asphalt Mixture obtained in reconstructions. The size of these materials may be reduced through grinding systems.

In general terms, the industrial equipment for the hot recycling of asphalt mixes according to the present disclosure may comprise a portable bank of hoppers of continuous metering of RAP and unadulterated petrous materials; this metering system may be necessary to adjust the granulometric curve of the Resulting Recycled Asphalt Mixture. The bank of hoppers may be mounted on a supporting structure that may include gear motors with frequency converter (as observed in FIG. 1), in order to control the metering amount of RAP and unadulterated petrous material; such gear motors may send a signal to a RAP flow indicator. Also an input flow indicator of unadulterated petrous material may send another signal to a control panel where it may be recorded and controlled; such control panel may be adjacent or located remotely. Below the portable bank of hoppers used for metering, there may be a conveyor belt that receives RAP and unadulterated petrous material. Such material may be transported to the steel plate rotary cylinder supported on 4 load rollers and may also be used as a power system to rotate the cylinder.

The diameter and length of the rotary cylinder may depend on the production capacity required. The inner part of the cylinder may be provided with an internal metal helicoid forming a circular space in the middle forming a flame conduction zone through its internal portion thus generating the indirect heating zone. The helicoid may take 30-80%, preferably a 60%, of the total length of the rotary cylinder. The remaining percentage may be made by straight paddles located in the internal perimeter of the cylinder defining the mixing zone.

At the point in which the helicoid ends and the mixing paddles begin, there may be the injection of asphalt—rejuvenating agent enhanced with polymers (injected mixture); this injection may be made through a volumetric gear pump through an injection pipe coming from the storage tank.

The rotary cylinder may be provided with an industrial open-flame burning system used to transmit heat energy to the RAP and to the supply of petrous material. The heat capacity of the industrial burner may depend on the recycling production requirements.

The fire of the industrial burner may make no contact with the RAP or petrous materials since they are protected by the metal walls of the helicoid, thus forming the zone for indirect heating of the materials to be processed. The direction of the flame may be parallel to the direction of the heating flow of RAP and supply of unadulterated petrous material.

These RAP materials, petrous materials, asphalt-rejuvenating agent enhanced with polymers, in their optimal metering and temperature, may arrive to the mixing zone where they may be homogenized and form a hot asphalt mixture.

This hot asphalt mix may move towards the outlet where there is an assembly made of paddles expelling it from the rotary cylinder, that mix may then be passed to a recycled asphalt mix lifting system which may serve as a paddle conveyor, to a silo of recycled asphalt mix for discharging into trucks for purposes of transportation and application on roads.

The outlet of the rotary cylinder of the industrial equipment for the hot recycling of asphalt mixes may comprise a temperature sensor that may send a signal to the recycled asphalt mix temperature indicator in the control panel where it may be recorded and controlled The industrial equipment for the hot recycling of asphalt mixes may be provided with a gear motor with frequency converter under the rotary cylinder that through transmissions and load rollers may cause the rotation of the industrial equipment cylinder.

The frequency converter may be controlled from the control panel in order to increase or decrease the rotation speed of the industrial equipment cylinder. This may be made to maintain an optimal temperature of the recycled asphalt mixture.

This parameter may be very important because when the exhaust temperature of the recycled asphalt mixture is over the optimal temperature, the frequency of the converter may be increased in order to process a higher amount of material and in this way to decrease the exhaust temperature of the recycled asphalt mixture.

On the contrary, when the exhaust temperature of the recycled asphalt mixture is below the optimal temperature, the frequency of the converter may be decreased in order to process a lower quantity of material and in this way to increase the exhaust temperature of the recycled asphalt mixture.

The industrial equipment for the hot recycling of asphalt mixes may be provided with a tank for storing asphalt-rejuvenating agent enhanced with polymers.

Said storage tank may be a cylindrical horizontal tank with a temperature control heating system. The temperature control heating system may be equipped with temperature sensor systems, which may send a signal to the asphalt-rejuvenating agent enhanced with polymers temperature indicator located in the control panel.

This tank may also be provided with a system to meter asphalt-rejuvenating agent enhanced with polymers through a volumetric gear pump which may be injected through a pipe at the mixing zone.

The system to meter the asphalt-rejuvenating agent enhanced with polymers may have a flow sensor that sends a signal to the asphalt—rejuvenating agent enhanced with polymers flow indicator located in the control panel for registration.

The industrial equipment for the hot recycling of asphalt mixes may also be provided with a fuel storage tank. This is a cylindrical horizontal tank containing the industrial liquid fuel to be used in the industrial burning system of the rotary cylinder of the industrial equipment for the hot recycling of asphalt mixes.

The control panel may comprise instruments to measure temperatures, material metering control; RAP; petrous materials, asphalt-rejuvenating agent enhanced with polymers of the industrial equipment for the hot recycling of asphalt mixes.

From this point, the production may be operated and the quality of the hot recycled asphalt mix may be controlled, in the industrial equipment for the hot recycling of asphalt mix.

The process for the hot recycling of asphalt mixes may include the following steps:

I. Preliminary analysis
   1) Lab test of the samples of pavement may be recycled.
      a) Determination of the existing granulometry.
      b) Determination of the percentage of supply of unadulterated petrous material to optimize the granulometry of the Recycled Asphalt Mix.
      c) Determination of the degree of aging of RAP through testing of penetration, viscosity, softening point.
      d) Determination of the amount of supply of Asphalt-Rejuvenating Agent enhanced with Polymers to restore the physical and chemical properties of the asphalt to reach optimal content of asphalt in the Recycled asphalt mix.
   2) Milling of the asphalt surface.
      a) Cold: Cold milling modifies the granulometric curve of the Asphalt Mix. It may also modify the asphalt content in the Asphalt Mix.
         This may be corrected by supplying the unadulterated petrous material before introducing the materials into the Industrial Recycling Equipment.
         The content of asphalt may be corrected by supplying the lacking quantity of asphalt-rejuvenating agent enhanced with polymers, in the mixing zone until reaching the optimal content of project.
      b) Hot: Hot milling may not modify the granulometric curve of the Asphalt Mix. It may not modify the asphalt content in the Asphalt Mix either.
   3) Loading and Transportation of RAP into the Industrial Equipment for Hot Recycling of Asphalt Mixes.

4) RAP may be deposited in one of the Hopper of the Hopper System and the unadulterated petrous material may be deposited in the remaining hoppers.
5) The RAP and the supply of petrous materials may be metered by means of the hopper system. This metering may be made based on a previous lab test to determine the optimal supply of unadulterated petrous material to obtain an optimal granulometric curve. The hopper system may be provided with a belt conveying the mixture of RAP and supply of exhausted petrous materials, a weight measuring and control system to record the amount of material may be supplied in weight into the Industrial Equipment for Hot Recycling Asphalt Mixes.
6) The RAP material and the supply of petrous material may be introduced into the rotary cylinder of the Industrial Equipment for the Hot Recycling of Asphalt Mixes through a belt conveying the mixture of RAP and supply of petrous materials.

II. Hot Recycling of Asphalt Mixes
1) Upon entering the RAP and the supply of unadulterated petrous material in the Industrial Equipment for the Hot Recycling of Asphalt Mixes, they may be indirectly heated because they are protected from fire through the metal walls of the internal helicoid until the RAP material and the supply of the petrous material reach optimal temperatures at which the solid asphalt in RAP may become liquid without reaching combustion. These temperatures may preferably be about 140-160° C.
   This heating may be produced indirectly since fire does not contact the materials to be recycled for being protected by the metal walls of the helicoid.
   The materials to be recycled may move due to the rotation of the metal helicoid inside the cylinder up to the mixing zone.
   The helicoid may take from 30-80%, preferably a 60%, of the length of the cylinder, and the rest may be located in the mixing zone.
   This proportion may allow the optimization of the mixing and heating process to recycle 100% of RAP, as mentioned above.
2) Once the materials to be recycled reach the mixing point, they may be injected with asphalt—rejuvenating agents enhanced with polymers through a pipe to improve the characteristic of the resulting Asphalt Recycled Mix.
   The Rejuvenating Agent modified with polymers, with a percentage of asphalt, metered in optimal amounts to the mixture of RAP and supply of unadulterated petrous material may result in a hot recycled asphalt mix of excellent quality.
   By conducting a preliminary lab test, the optimal metering may be determined to achieve the desired amount by combining:
   a) RAP
   b) Unadulterated petrous materials
   c) Asphalt
   d) Rejuvenating Agent enhanced with Polymers

Figure 1:
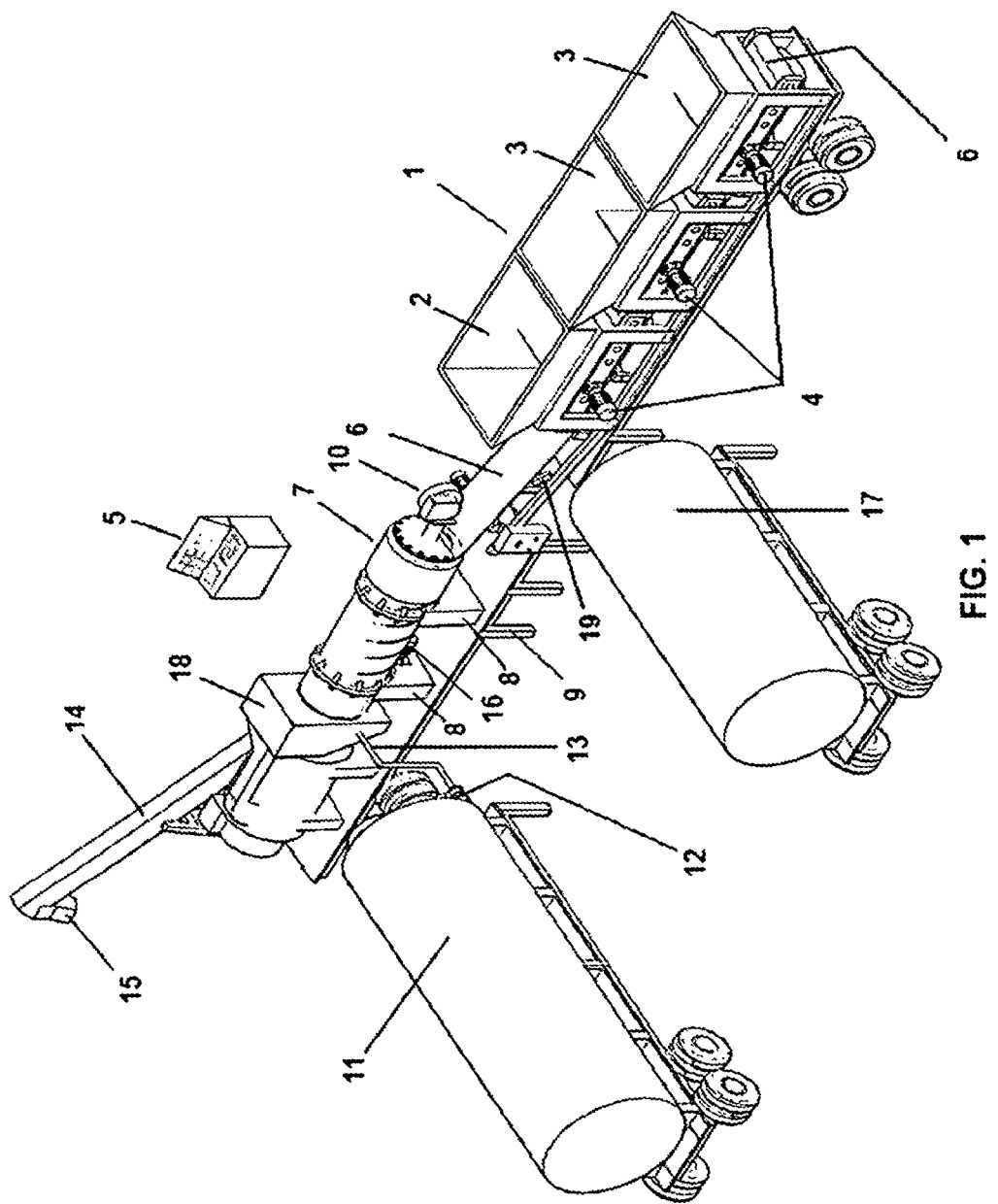
FIG. 1 illustrates a perspective view of the industrial equipment for the hot recycling of asphalt mixes.

For a better understanding of the present disclosure, a detailed description of any of its embodiments will be made, shown in the drawings that as a way of illustration but not of limitation are attached to the present description.

DETAILED DESCRIPTION

One of ordinary skill in the art would appreciate that the current disclosure encompasses various embodiments for industrial equipment used for the hot recycling of asphalt mixes. In some embodiments, the industrial equipment may comprise a portable bank of hoppers that may be operable to meter RAP and unadulterated petrous materials. The bank of hoppers may be mounted on a supporting structure. The industrial equipment may further comprise a plurality of gear motors with frequency converters. The plurality of gear motors may be operable to control the metering of the RAP and unadulterated petrous materials. The plurality of gear motors may be operable to send a flow indicator signal to a control panel. The control panel may be operable to record the flow indicator signal. The plurality of gear motors may be mounted on the supporting structure as well.

The industrial equipment may further comprise a conveyor belt disposed below the bank of hoppers. The conveyor belt may be operable to receive the unadulterated petrous materials and transport them toward an inlet of a rotary cylinder. The conveyer belt may be supported on a plurality of load rollers. The plurality of load rollers may be operable to drive the rotation of the cylinder.

The industrial equipment may further comprise a tank. The tank may be operable to store a mixture of asphalt-rejuvenating agents. The tank may comprise a connecting pipe operable to meter the asphalt-rejuvenating agents towards the rotary cylinder. The metering of the asphalt-rejuvenating agents may be controlled by a volumetric gear pump. An outlet of the rotary cylinder may comprise a temperature sensor operable to send a signal to a recycled asphalt mix temperature indicator in the control panel.

The industrial equipment may further comprise a recycled asphalt mix lifting system disposed adjacent to the outlet of the rotary cylinder. The recycled asphalt mix lifting system may be operable to transport a recycled asphalt mix to a discharge silo.

The industrial equipment may further comprise a combustion gas extractor disposed in the rotary cylinder. The combustion gas extractor may be operable to discharge combustion gases from a burner.

The industrial equipment may further comprise a fuel storage tank and a weight measuring element. The fuel storage tank and weight measuring element may be provided under the conveyor belt at the inlet of the rotary cylinder. The weight measuring element may be operable to record a weight of a material to be supplied.

The rotary cylinder may comprise an open-flame industrial burner mounted at the beginning of the cylinder. The open-flame industrial burner may be operable to transmit heat energy to the RAP and the unadulterated petrous materials. The rotary cylinder may further comprise the aforementioned inlet and outlet, and an internal continuous metal helicoid. The internal continuous metal helicoid may comprise a length of about 30% to about 80% of a length of the rotary cylinder. The walls of the internal continuous metal helicoid may form a circular space in the center of the internal continuous metal helicoid. The circular space may be operable as a flame conduction zone. The internal continuous metal helicoid may comprise a zone disposed between the walls. The zone may be operable for conduction or conveyance of the RAP and the unadulterated petrous materials, in a flame direction, as the rotary cylinder rotates. Accordingly, an indirect heat energy transfer may transform solid asphalt contained in the RAP to a liquid phase without reaching combustion. The rotary cylinder may further comprise an injection zone of the asphalt-rejuvenating agents. The injection zone may be disposed adjacent to an end of the helicoid.

According to some embodiments, a plurality of mixing paddles may be disposed in an internal perimeter of the rotary cylinder and after the internal continuous metal helicoid. The plurality of mixing paddles may form a mixing zone. The plurality of mixing paddles may be operable to form a mixture by mixing the RAP and the unadulterated petrous materials with the asphalt-rejuvenating agents.

According to some embodiments, a plurality of expelling paddles may be disposed adjacent to the plurality of mixing paddles. The plurality of expelling paddles may be operable to expel the mixture through the outlet of the rotary cylinder. The plurality of mixing paddles and the plurality of expelling paddles may occupy the remaining space in the rotary cylinder to recycle 100% RAP.

In some embodiments of the present disclosure, the plurality of gear motors may transmit movement to the plurality of load rollers and generates rotation of the rotary cylinder. Further, the industrial equipment may also comprise a frequency converter operable to be controlled from the control panel to regulate the rotation speed, temperature, and capacity of production of the recycled asphalt mixture.

In some embodiments of the present disclosure, the asphalt-rejuvenating agents are enhanced with polymers.

In some embodiments of the present disclosure, the internal continuous metal helicoid may have a length of about 60% of the length of the rotary cylinder.

In some embodiments of the present disclosure, the tank may further comprise a horizontal cylindrical tank comprising a heating system, a temperature control, and a temperature sensor system. Further, the temperature sensor system may be operable to send a signal to an asphalt-rejuvenating agent indicator located at the control panel.

In some embodiments of the present disclosure, the volumetric gear pump may comprise a flow sensor operable to send a signal to the an asphalt-rejuvenating agent indicator located at the control panel. The signal may be recorded at the control panel. The control panel may control the volumetric gear pump.

In some embodiments of the present disclosure, the control panel may any number of the following features including: a module that may be operable to start and shut down engines of the industrial equipment and the plurality of gear motors; a module that may be operable to control the frequency converters of the gear motors; an indicator for an amperage of the engines and the plurality of gear motors; an indicator for a temperature of the recycled asphalt mixture; an indicator for a temperature of the asphalt-rejuvenating agent; an indicator for a temperature of an internal space of the rotary cylinder; an indicator for a flow rate of the RAP; an indicator for a flow rate of the unadulterated petrous materials; an indicator for a flow rate of the asphalt-rejuvenating agent; and a screen that may be operable to display the operational flow diagram of the industrial equipment.

One of ordinary skill in the art would appreciate that the current disclosure encompasses various embodiments for methods of conducting a recycling process for hot asphalt mixes. The method may comprise, providing a portable bank of hoppers that may comprise a plurality of hoppers; providing a conveyor belt that may be disposed below the bank of hoppers; depositing RAP in a hopper in the plurality of hoppers; depositing unadulterated petrous materials in hoppers not containing RAP in the plurality of hoppers; metering the RAP and unadulterated petrous materials through the hopper system; weighing the RAP and unadulterated petrous materials to be supplied using a weight measuring device that may be disposed under the conveyor belt; transporting the RAP and unadulterated petrous materials through the conveyor belt towards an inlet of a rotary cylinder; moving the RAP and unadulterated petrous materials toward a burner flame, from the inlet to a subsequent outlet, by rotating the rotary cylinder; transporting the RAP and unadulterated petrous materials through a internal continuous metal helicoid that may be disposed within the rotary cylinder, wherein the internal continuous metal helicoid may have a length of about 305 to about 80% of a length of the rotary cylinder; indirectly heating the RAP and unadulterated petrous materials at about 140° C. to about 160° C. using an open-flame industrial burner, wherein the open-flame industrial burner may be disposed at the beginning of the rotary cylinder, and wherein the RAP and unadulterated petrous materials may be protected from direct heating by metal walls of the internal continuous metal helicoid; transforming an asphalt component of the RAP to liquid phase without reaching combustion to result in a transformed mixture; injecting asphalt-rejuvenating agent at an injection point to the transformed mixture to result in a treated mixture, wherein the injection point may be disposed at an end of the internal continuous metal helicoid; transporting the treated mixture along the internal continuous metal helicoid; mixing the treated mixture using a plurality of mixing paddles; expelling from the internal continuous metal helicoid hot recycled asphalt mix using a plurality of expelling paddles; and discharging combustion gases through the gas extractor during the recycling process.

In order to readily understand the features of the present disclosure, the foregoing description includes drawings as a way of illustration but not of limitation, described below corresponding to the preferred embodiment.

Embodiments of the industrial equipment for the hot recycling of asphalt mixes are shown in the following description and in the accompanying figures.

The same reference signals are used to indicate the same parts.

FIG. 1 illustrates a conventional view of the industrial equipment for the hot recycling of asphalt mixes comprising a portable bank of hoppers for continuous metering 1 which may comprise a hopper for metering of RAP 2 and two or more compartments of hoppers for metering of unadulterated petrous materials 3 necessary to adjust the granulometric curve of the resulting recycled asphalt mixture, mounted on a supporting structure that include gear motors 4 with frequency converter in its conveyor belt (see FIG. 1), in order to control the amount of metering of RAP and unadulterated petrous material; which may send a signal to a RAP flow indicator 34 (see FIG. 3) and an unadulterated petrous material flow indicator 35 (see FIG. 3) to a control panel 5 where it may be recorded, which may be adjacent or remotely located; below of that portable bank of hoppers used to meter 1, there may be a conveyor belt 6 receiving RAP and unadulterated petrous material and transporting them to a rotary cylinder 7 in steel plate, supported on four load rollers 8 also used as a power system to rotate the cylinder, and mounted on a supporting structure 9.

The rotary cylinder 7 may be provided with an industrial open-flame burning system 10 mounted at the beginning of the rotary cylinder 7 in order to transmit the heat energy to the RAP and to the supply of petrous material. The heat capacity of the industrial burner 10 may depend on the requirements of production of the hot recycled asphalt mix.

Figure 2:
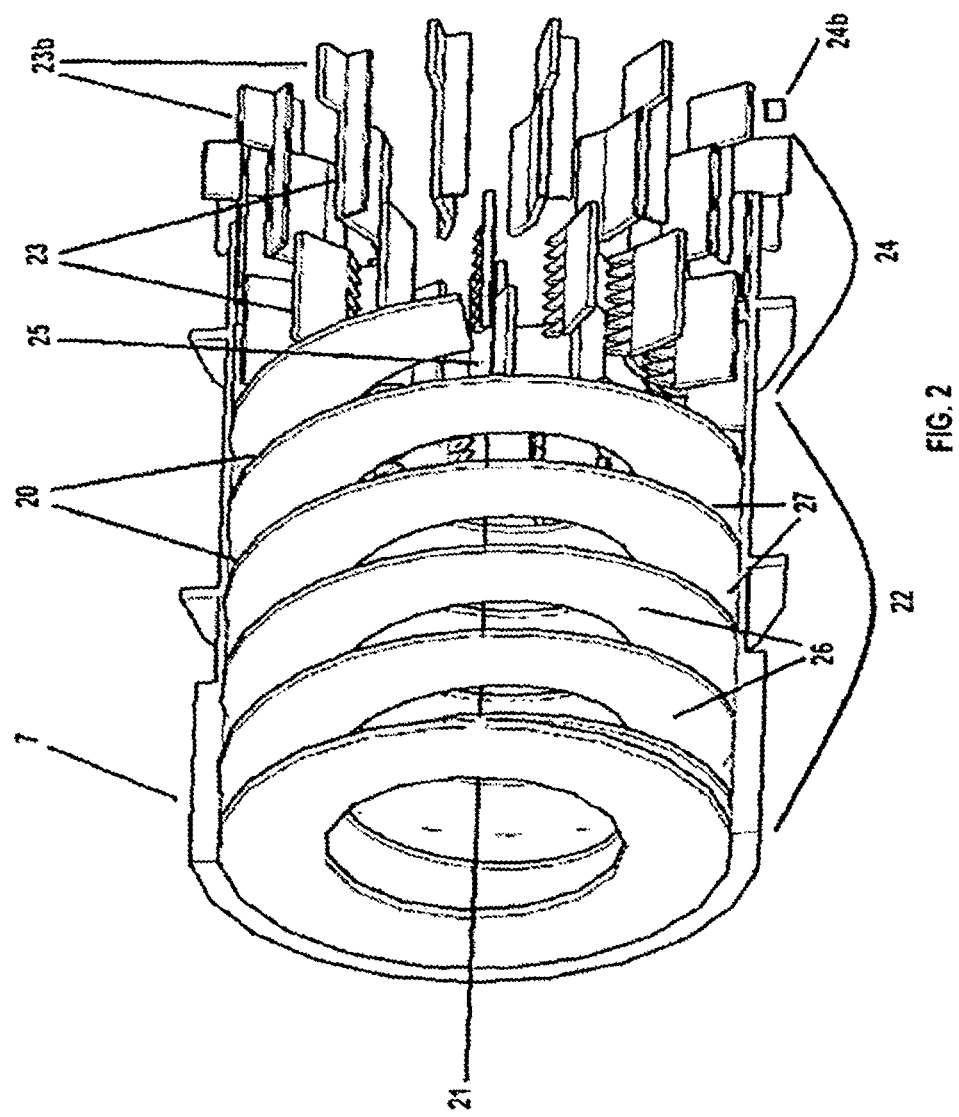
FIG. 2 illustrates a perspective view of the internal part of the rotary drum of the industrial equipment for the hot recycling of asphalt mixes.

The industrial equipment for the hot recycling of asphalt mixes may be provided with a tank for storing asphalt-rejuvenating agent enhanced with polymers 11 from which the mixture of asphalt-rejuvenating agent enhanced with polymers may be metered through a volumetric gear pump 12 injecting through a pipe 13 until the mixing zone 24 (see FIG. 2)

These RAP materials, petrous materials, asphalt-rejuvenating agent enhanced with polymers, in their optimal metering and temperature, arrive to the mixing zone 24 (see FIG. 2) within the rotary cylinder 7 where they homogenized, said mixing zone 24 has a plurality of mixing paddles located in the internal part of the rotary cylinder 7, and that plurality of paddles may be formed by two series of paddles 23 separated one from the other, one of these series may be formed by straight teethed paddles for mixing and the second series is "V" shaped.

This hot asphalt mix moves toward the outlet where there may be an assembly made of paddles 23b (see FIG. 2) that expels the mix from the rotary cylinder 7, from there it moves to a recycled asphalt mix lifting system 14, which may serve as a paddle conveyor, to a silo of recycled asphalt mix 15 used to discharge it into trucks for purposes of transportation and application on roads.

The outlet of the rotary cylinder 7 of the industrial equipment for the hot recycling of asphalt mixes may be provided with a temperature sensor 24b (see FIG. 2) that sends a signal to the recycled asphalt mixture temperature indicator in the control panel 5 where it may be recorded.

The industrial equipment for the hot recycling of asphalt mixes may be provided with a gear motor with frequency converter 16 under the rotary cylinder that, through transmissions and load rollers 8, may make the cylinder 7 of the industrial equipment rotate.

The frequency converter may be controlled from the control panel 5 in order to increase or decrease the rotation speed of the industrial equipment cylinder. This may be intended to control the optimal temperature of the recycled asphalt mixture.

This parameter may be very important because when the exhaust temperature of the recycled asphalt mixture is over the optimal temperature, the frequency of the converter may be increased in order to process a higher amount of material and in this way decrease the exhaust temperature.

On the contrary, when the exhaust temperature of the recycled asphalt mixture is below the optimal temperature, the frequency of the converter may be decreased in order to process a lower amount of material and in this way increase the exhaust temperature of the recycled asphalt mixture.

The industrial equipment for the hot recycling of asphalt mixes also has a fuel storage tank 17. This may be a cylindrical horizontal tank containing the industrial liquid fuel to be used in the industrial burning system 10 of the rotary cylinder 7 of the industrial equipment for the hot recycling of asphalt mixes.

Such rotary cylinder 7 may comprise a combustion gas extractor 18 through which combustion gases may be discharged.

A weight measuring element 19 may be provided below the conveyor belt 6 at the inlet of the rotary cylinder 7, recording the amount of RAP material and the supply of unadulterated petrous material to be provided in weight to the Industrial Equipment for the Hot Recycling of Asphalt Mixes. And it may also send a signal to RAP flow indicator 34 (see FIG. 3), and the supply of unadulterated petrous material flow indicator 35 (see FIG. 3) to a control panel 5.

As for FIG. 2 that shows a conventional perspective view of the internal part of the rotary drum of the industrial equipment for the hot recycling of asphalt mixes. In that figure, the internal part of rotary cylinder 7 may be provided with an internal metal helicoid 20 delimiting the walls of the helicoid 26 a circular space in its center thereby forming the flame conduction zone 21 through its inner part and between those metallic walls of the helicoid there is a zone to convey RAP and supply of unadulterated petrous material 27, it may also generate an indirectly heating zone 22. The helicoid takes 30-80%, preferable a 60%, of the total length of the rotary cylinder. The rest of the percentage may be formed by mixing straight paddles 23, located in the internal perimeter of the cylinder forming the mixing zone 24. This hot asphalt mix moves toward the outlet housing an assembly made of paddles 23b that expel it from the rotary cylinder 7, this point may be provided with a temperature sensor 24b, which sends a signal to the recycled asphalt mix temperature indicator in the control panel 5 for registration. At the point where the helicoid ends and the mixing paddles begin, there may be an injection point for injecting asphalt-rejuvenating agent enhanced with polymers 25, this injection may be made through a volumetric gear pump of Asphalt-Rejuvenating Agent enhanced with polymers through an injecting pipe 13, coming from the storage tank 11 (see FIG. 1)

Figure 3:
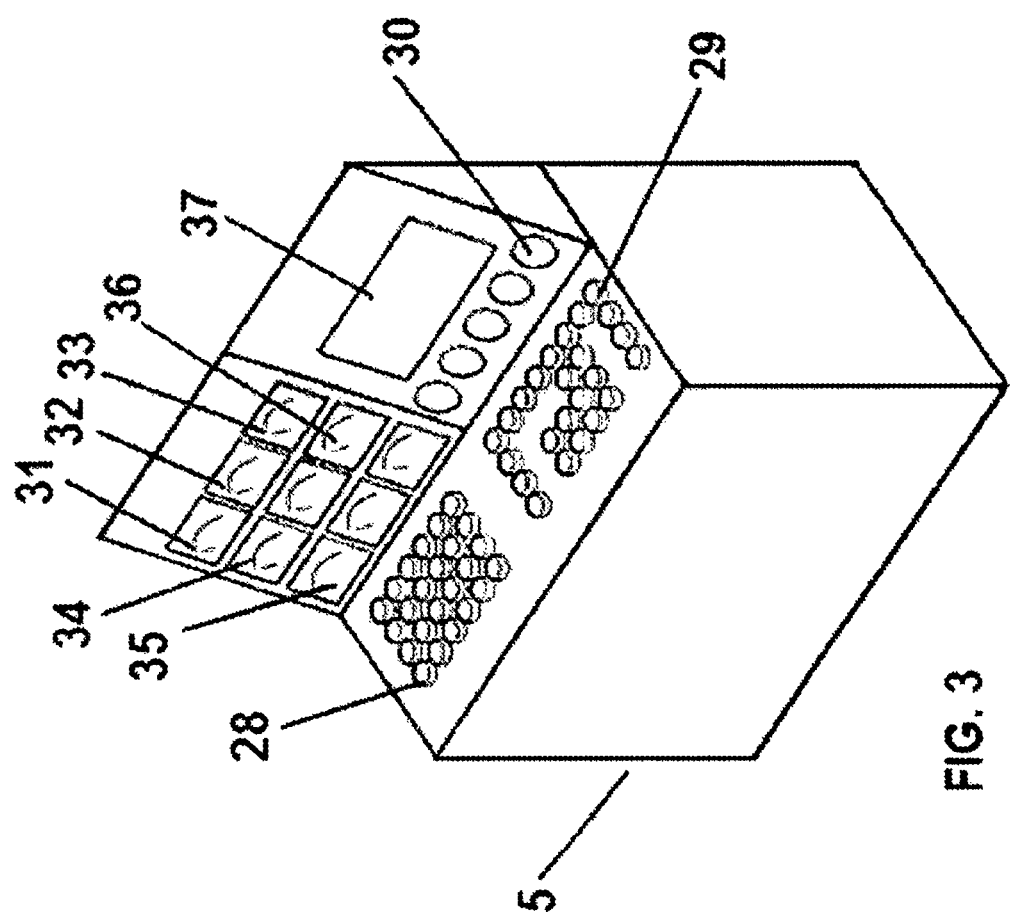
FIG. 3 illustrates a perspective view of the control panel of the industrial equipment for the hot recycling of asphalt mixes.

FIG. 3 illustrates a conventional view of the control panel of the industrial equipment for the hot recycling of asphalt mixes. In this Figure, the control panel 5 includes means of control to start and shut down the engines and gear motors of the industrial equipment 28, means of control of frequency converters of gear motors 29, indicators of amperage of engines and gear motors 30, recycled asphalt mix temperature indicators 31, asphalt-rejuvenating agent temperature indicators 32, indicators of temperature of the inner part of the rotary cylinder 33, RAP flow indicators 34, petrous material supply flow indicator 35, asphalt-rejuvenating agent flow indicator 36 and a screen with the operation flow diagram of the industrial equipment 37.

One of ordinary skill in the art having the benefit of the present disclosure may be able to reproduce and obtain the results mentioned in the above description. However, any person with skills in the technical area covering the present disclosure may be able to make modifications not described in this application; however, if for the application of these modifications in a determined structure or in the manufacturing process of the same, it is required the subject matter mentioned in the following claims, such structures should be included within the scope of the present disclosure.

The invention claimed is:

1. Industrial equipment for hot recycling of asphalt mixes, comprising:
   a portable bank of hoppers operable to meter recycled asphalt pavement and unadulterated petrous materials;
      wherein the bank of hoppers are mounted on a supporting structure;
   a plurality of gear motors;
      wherein the plurality of gear motors comprise a plurality of frequency converters;
      wherein the plurality of gear motors are operable to control the metering of the recycled asphalt pavement and unadulterated petrous materials,
      wherein the plurality of gear motors are operable to send a flow indicator signal to a control panel;

wherein the control panel is operable to record the flow indicator signal; and
wherein the plurality of gear motors are mounted on the supporting structure;
a conveyor belt disposed below the bank of hoppers;
wherein the conveyor belt is operable to receive the unadulterated petrous materials and transport them toward an inlet of a rotary cylinder;
wherein the conveyer belt is supported on a plurality of load rollers; and
wherein the plurality of load rollers are operable to drive the rotation of the cylinder;
a tank;
wherein the tank is operable to store a mixture of asphalt-rejuvenating agents;
wherein the tank comprises a connecting pipe operable to meter the asphalt-rejuvenating agents towards the rotary cylinder;
wherein the metering of the asphalt-rejuvenating agents is controlled by a volumetric gear pump; and
wherein an outlet of the rotary cylinder comprises a temperature sensor operable to send a signal to a recycled asphalt mix temperature indicator in the control panel;
a recycled asphalt mix lifting system disposed adjacent to the outlet of the rotary cylinder;
wherein the recycled asphalt mix lifting system is operable to transport a recycled asphalt mix to a discharge silo;
a combustion gas extractor disposed in the rotary cylinder operable to discharge combustion gases from a burner; and
a fuel storage tank and a weight measuring element provided under the conveyor belt at the inlet of the rotary cylinder;
wherein the weight measuring element is operable to record a weight of a material to be supplied;
wherein the rotary cylinder comprises:
an open-flame industrial burner mounted at the inlet of the cylinder, wherein the open-flame industrial burner is operable to transmit heat energy to the recycled asphalt pavement and unadulterated petrous materials;
the inlet;
the outlet;
an internal continuous metal helicoid;
wherein the internal continuous metal helicoid comprises a length of about 30% to about 80% of a length of the rotary cylinder;
wherein walls of the internal continuous metal helicoid form a circular space in the center of the internal continuous metal helicoid, the circular space operable as a flame conduction zone; and
wherein the internal continuous metal helicoid comprises a zone disposed between the walls;
wherein the zone is operable for conduction or conveyance of the recycled asphalt pavement and unadulterated petrous materials, in a flame direction, as the rotary cylinder rotates; and
wherein an indirect heat energy transfer transforms solid asphalt contained in the recycled asphalt pavement to a liquid phase without reaching combustion;
an injection zone of the asphalt-rejuvenating agents;
the injection zone disposed adjacent to an end of the helicoid;
a plurality of mixing paddles disposed in an internal perimeter of the rotary cylinder and after the internal continuous metal helicoid;
wherein the plurality of mixing paddles form a mixing zone;
wherein the plurality of mixing paddles are operable to form a recycled asphalt mixture by mixing the recycled asphalt pavement and unadulterated petrous materials with the asphalt-rejuvenating agents;
a plurality of expelling paddles disposed adjacent to the plurality of mixing paddles;
wherein the plurality of expelling paddles are operable to expel the mixture through the outlet of the rotary cylinder; and
wherein the plurality of mixing paddles and the plurality of expelling paddles occupy a remainder space of the rotary cylinder to recycle 100% recycled asphalt pavement.

2. The industrial equipment according to claim 1,
wherein the plurality of gear motors transmits movement to the plurality of load rollers and generates rotation of the rotary cylinder; and
wherein the industrial equipment further comprises at least one of the plurality of frequency converters, wherein the at least one of the plurality of frequency converters is operable to be controlled from the control panel to regulate the rotation speed, temperature, and capacity of production of the recycled asphalt mixture.

3. The industrial equipment according to claim 1,
wherein the asphalt-rejuvenating agents are enhanced with polymers.

4. The industrial equipment according to claim 1,
wherein the internal continuous metal helicoid comprises a length of about 60% of the length of the rotary cylinder.

5. The industrial equipment according to claim 1,
wherein the tank is a horizontal cylindrical tank comprising a heating system, a temperature control, and a temperature sensor system; and
wherein the temperature sensor system is operable to send a signal to an asphalt-rejuvenating agent indicator located at the control panel.

6. The industrial equipment according to claim 1,
wherein the volumetric gear pump comprises a flow sensor operable to send a signal to an asphalt-rejuvenating agent indicator located at the control panel;
wherein the control panel is operable to record the signal; and
wherein the control panel controls the volumetric gear pump.

7. The industrial equipment according to claim 1, wherein the control panel comprises:
a module operable to start and shut down engines of the industrial equipment and the plurality of gear motors;
a module operable to control the frequency converters of the gear motors;
an indicator for an amperage of the engines and the plurality of gear motors;
an indicator for a temperature of the recycled asphalt mixture;
an indicator for a temperature of the asphalt-rejuvenating agent;
an indicator for a temperature of an internal space of the rotary cylinder;
an indicator for a flow rate of the recycled asphalt pavement;

an indicator for a flow rate of the unadulterated petrous materials;

an indicator for a flow rate of the asphalt-rejuvenating agent; and a screen operable to display an operational flow diagram of the industrial equipment.

8. A method of conducting a recycling process for hot asphalt mixes, the method comprising:

providing a portable bank of hoppers comprising a plurality of hoppers;

providing a conveyor belt disposed below the bank of hoppers;

depositing recycled asphalt pavement in a hopper in the plurality of hoppers;

depositing unadulterated petrous materials in hoppers not containing the recycled asphalt pavement in the plurality of hoppers;

metering the recycled asphalt pavement and unadulterated petrous materials through the hopper system;

weighing the recycled asphalt pavement and unadulterated petrous materials to be supplied using a weight measuring device disposed under the conveyor belt;

transporting the recycled asphalt pavement and unadulterated petrous materials through the conveyor belt towards an inlet of a rotary cylinder;

moving the recycled asphalt pavement and unadulterated petrous materials toward a burner flame, from the inlet to a subsequent outlet, by rotating the rotary cylinder;

transporting the recycled asphalt pavement and unadulterated petrous materials through an internal continuous metal helicoid disposed within the rotary cylinder, wherein the internal continuous metal helicoid comprises a length of about 30% to about 80% of a length of the rotary cylinder;

indirectly heating the recycled asphalt pavement and unadulterated petrous materials at about 140° C. to about 160° C. using an open-flame industrial burner; wherein the open-flame industrial burner is disposed at the inlet of the rotary cylinder; wherein the recycled asphalt pavement and unadulterated petrous materials are protected from direct heating by metal walls of the internal continuous metal helicoid;

transforming an asphalt component of the recycled asphalt pavement to liquid phase without reaching combustion to result in a transformed mixture;

injecting asphalt-rejuvenating agent at an injection point to the transformed mixture to result in a treated mixture; wherein the injection point is disposed at an end of the internal continuous metal helicoid;

transporting the treated mixture along the internal continuous metal helicoid;

mixing the treated mixture using a plurality of mixing paddles;

expelling from the internal continuous metal helicoid hot recycled asphalt mix using a plurality of expelling paddles; and discharging combustion gases through a gas extractor during the recycling process.

* * * * *